United States Patent [19]

Tarr

[11] Patent Number: 5,297,407
[45] Date of Patent: Mar. 29, 1994

[54] TRAILER LOCKING APPARATUS

[76] Inventor: Merwin E. Tarr, R.D. #5, Box 457, Franklin, Pa. 16323

[21] Appl. No.: 20,608

[22] Filed: Feb. 22, 1993

[51] Int. Cl.⁵ .............................................. B60R 25/00
[52] U.S. Cl. ...................................... 70/232; 70/258; 280/507
[58] Field of Search ....................... 70/18, 232, 258; 180/287; 280/507

[56] References Cited

U.S. PATENT DOCUMENTS

| | | | |
|---|---|---|---|
| 2,440,744 | 5/1948 | Grinnell et al. | 70/232 |
| 2,785,564 | 3/1957 | Rossi | 70/232 |
| 3,004,421 | 10/1961 | Bowler | 70/232 |
| 3,763,675 | 10/1973 | Hofmeister et al. | 70/232 |
| 3,832,872 | 9/1974 | Gerlach | 70/232 |
| 3,922,897 | 12/1975 | Mickelson | 70/232 |
| 4,407,146 | 10/1983 | Nielsen, Jr. | 70/232 |
| 4,620,718 | 11/1986 | Mickelson | 70/232 X |
| 5,052,203 | 10/1991 | Van Cuyk | 70/232 |
| 5,181,405 | 1/1993 | Wheeler | 70/232 |

*Primary Examiner*—Lloyd A. Gall
*Attorney, Agent, or Firm*—Leon Gilden

[57] ABSTRACT

A collar member is arranged to receive a trailer pin to effect surrounding of the trailer pin in order to prevent access to the trailer pin for unauthorized removal of the associated trailer structure. To this end, the collar includes a channel having a floor, and the channel further including a U-shaped rib arranged to guide a locking head onto the rib to secure the locking head within the channel and effect surrounding of the collar preventing access thereto.

2 Claims, 4 Drawing Sheets

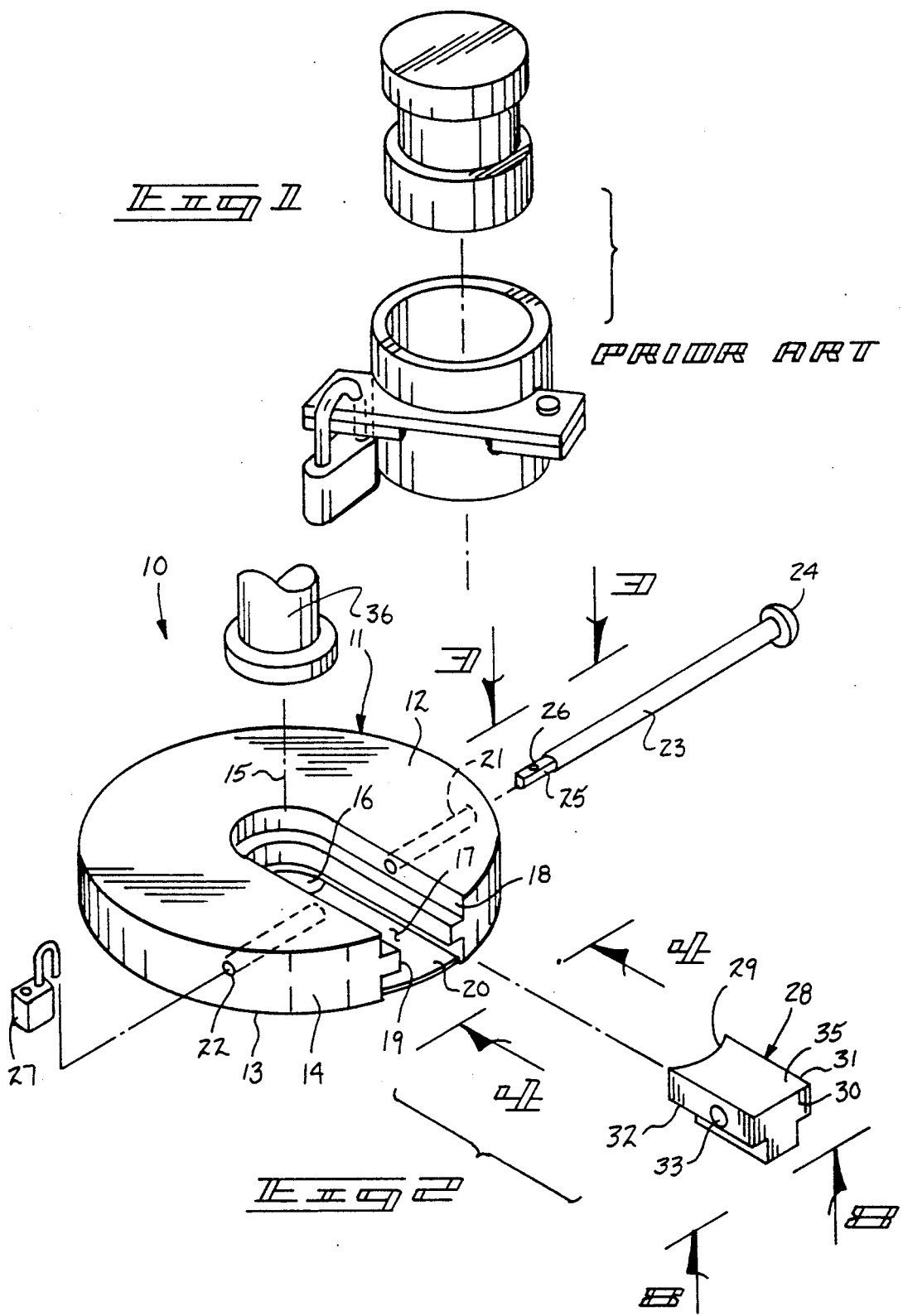

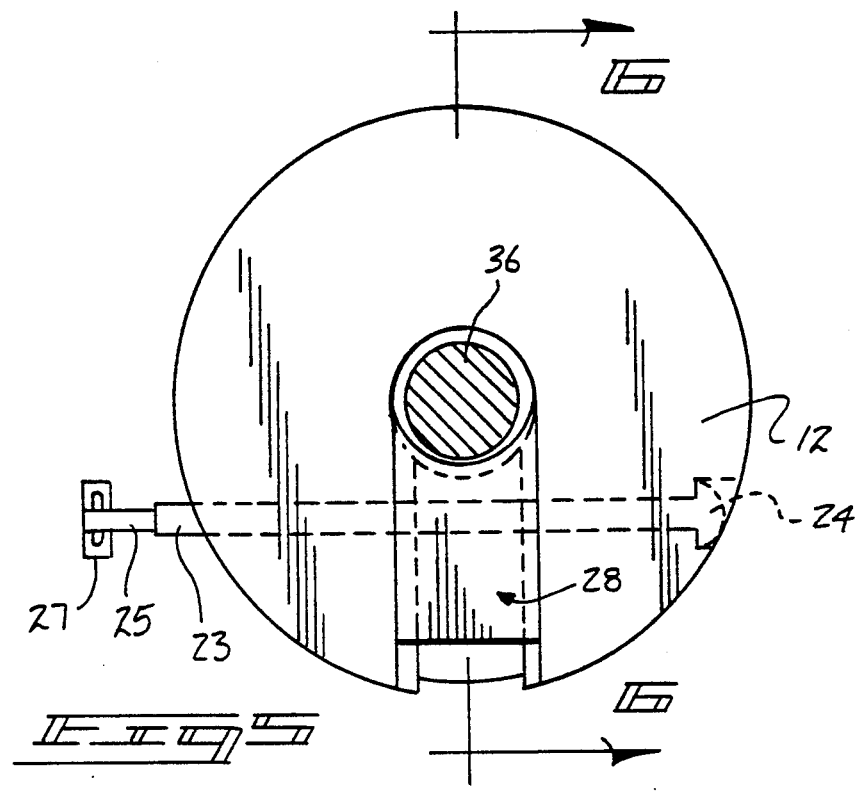
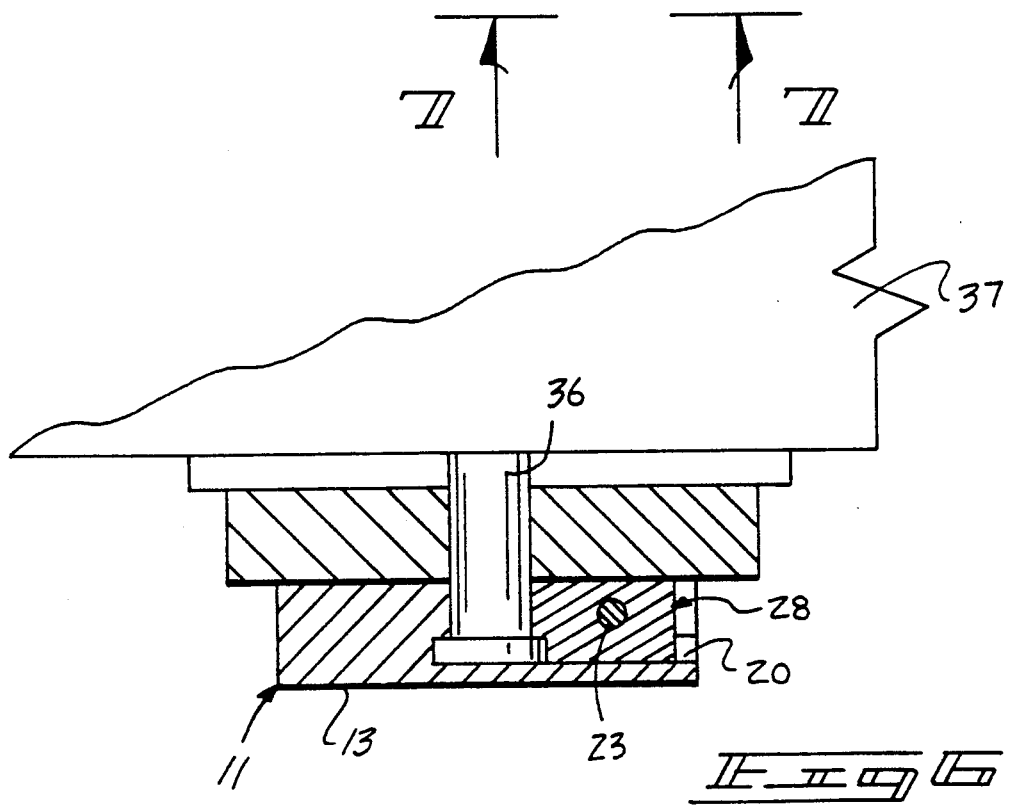

TRAILER LOCKING APPARATUS

BACKGROUND OF THE INVENTION

1. Field of the Invention

The field of invention relates to trailer lock structure, and more particularly pertains to a new and improved trailer locking apparatus wherein the same is arranged to effect surrounding engagement of a trailer lock pin preventing unauthorized removal of the associated trailer structure.

2. Description of the Prior Art

Trailer lock structure of various types have been employed in the prior art and indicated in the U.S. Pat. Nos. 5,052,203; 5,033,764; 4,882,921; and 4,614,357.

U.S. Pat. No. 5,052,203 indicates the use of a cylinder having a slot therethrough to receive a lock bar to secure a trailer lock pin within the lock bar, wherein the instant invention utilizes the collar structure to provide for surrounding engagement of the trailer pin employing a head structure arranged to engage the trailer pin in a surrounding relationship in association with the collar to prevent unauthorized access to the trailer pin and in this respect, the present invention substantially fulfills this need.

SUMMARY OF THE INVENTION

In view of the foregoing disadvantages inherent in the known types of trailer locking apparatus now present in the prior art, the present invention provides a trailer locking apparatus wherein the same is directed to the surrounding engagement of a trailer lock pin preventing access to the trailer lock pin. As such, the general purpose of the present invention, which will be described subsequently in greater detail, is to provide a new and improved trailer locking apparatus which has all the advantages of the prior art trailer locking apparatus and none of the disadvantages.

To attain this, the present invention provides a collar member arranged to receive a trailer pin to effect surrounding of the trailer pin in order to prevent access to the trailer pin for unauthorized removal of the associated trailer structure. To this end, the collar includes a channel having a floor, and the channel further including a U-shaped rib arranged to guide a locking head onto the rib to secure the locking head within the channel and effect surrounding of the collar preventing access thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer locking apparatus which has all the advantages of the prior art trailer locking apparatus and none of the disadvantages.

It is another object of the present invention to provide a new and improved trailer locking apparatus which may be easily and efficiently manufactured and marketed.

It is a further object of the present invention to provide a new and improved trailer locking apparatus which is of a durable and reliable construction.

An even further object of the present invention is to provide a new and improved trailer locking apparatus which is susceptible of a low cost of manufacture with regard to both materials and labor, and which accordingly is then susceptible of low prices of sale to the consuming public, thereby making such trailer locking apparatus economically available to the buying public.

Still yet another object of the present invention is to provide a new and improved trailer locking apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art trailer locking structure relative to a trailer lock pin, as indicated in the U.S. Pat. No. 5,052,203.

FIG. 2 is an isometric illustration of the invention arranged to receive a trailer pin.

FIG. 5 is an orthographic top view of the invention.

FIG. 6 is an orthographic view, taken along the lines 6—6 of FIG. 5 in the direction indicated by the arrows.

DESCRIPTION OF THE PREFERRED EMBODIMENT

Figure 3:
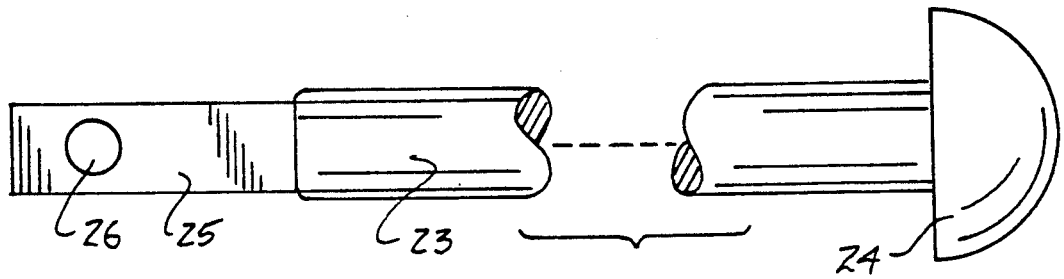
FIG. 3 is an orthographic view, taken along the lines 3—3 of FIG. 2 in the direction indicated by the arrows.

With reference now to the drawings, and in particular to FIGS. 1 to 8 thereof, a new and improved trailer locking apparatus embodying the principles and concepts of the present invention and generally designated by the reference numeral 10 will be described.

More specifically, the trailer locking apparatus 10 of the instant invention essentially comprises a locking collar 11 having a collar top wall 12 spaced from a collar bottom wall 13, with a collar side wall 14 and the collar 11 symmetrically oriented about a collar axis 15, having a collar bore 16 coaxially aligned with the collar axis through the collar in an orthogonal relationship relative to the top and bottom walls 12 and 13. A channel 17 is directed into the collar, having a channel entrance opening directed from the side wall 14 and the channel 17 projecting through the top wall, while the channel includes a channel floor plate 20 coplanar with the collar bottom wall 13. A U-shaped channel side wall 18 extends about the channel 17 from the side wall 14, with the channel side wall 18 having a U-shaped rib 19 coextensive with the channel side wall. A first pin bore 21 and a second pin bore 22 are coaxially aligned and directed into the collar side wall 14, with the first and second pin bores 21 and 22 intersecting the channel 17 and directed through facing panels of the channel side wall 18 such that the first and second pin bores 21 and 22 are coaxially aligned relative to one another and spaced apart in a facing relationship on opposed sides of the channel 17, with the first and second pin bores 21 and 22 arranged to receive a lock pin 23 therethrough, with the lock pin 23 extending through the first and second pin bores 21 and 22, as well as the channel 17. The lock pin 23 includes a lock pin head 24 at a first end of the lock pin, while a lock pin flange 25 is mounted at a second end of the lock pin, with the lock pin flange 25 having a flange bore 26 to receive a lock member 27 therethrough to permit unauthorized removal of the lock pin such that the lock pin flange 25 projects exteriorly of the collar side wall 14 permitting reception of the lock member 27 exteriorly of the collar side wall 14, in a manner as indicated in the FIG. 5 for example.

Figure 4:
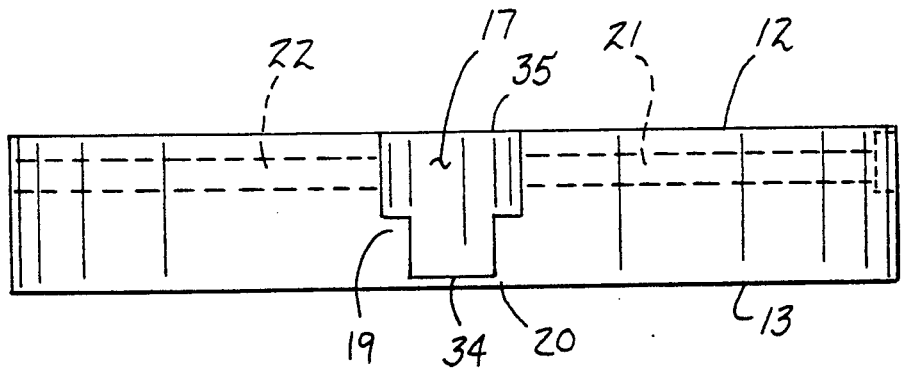
FIG. 4 is an orthographic view, taken along the lines 4—4 of FIG. 2 in the direction indicated by the arrows.
Figure 7:
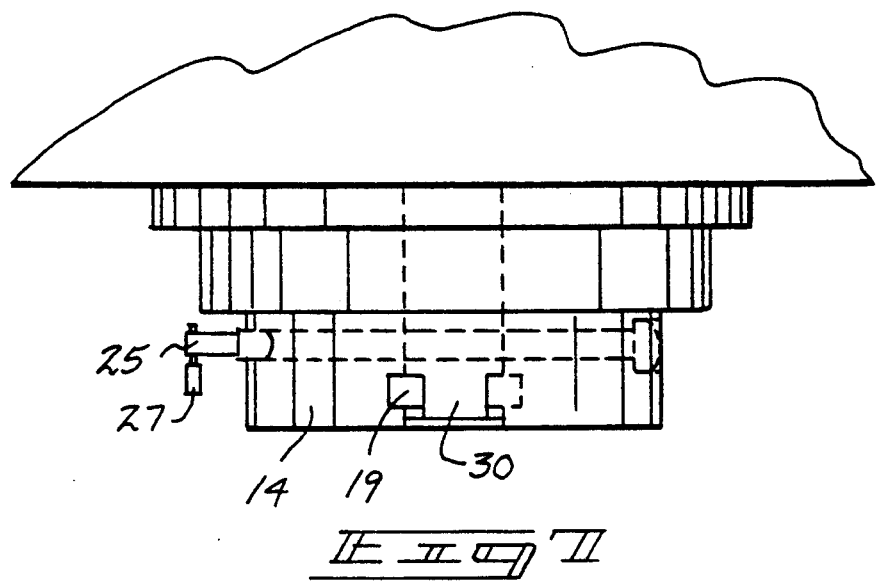
FIG. 7 is an orthographic end view of the invention, taken along the lines 7—7 of FIG. 5 in the direction indicated by the arrows.
Figure 8:
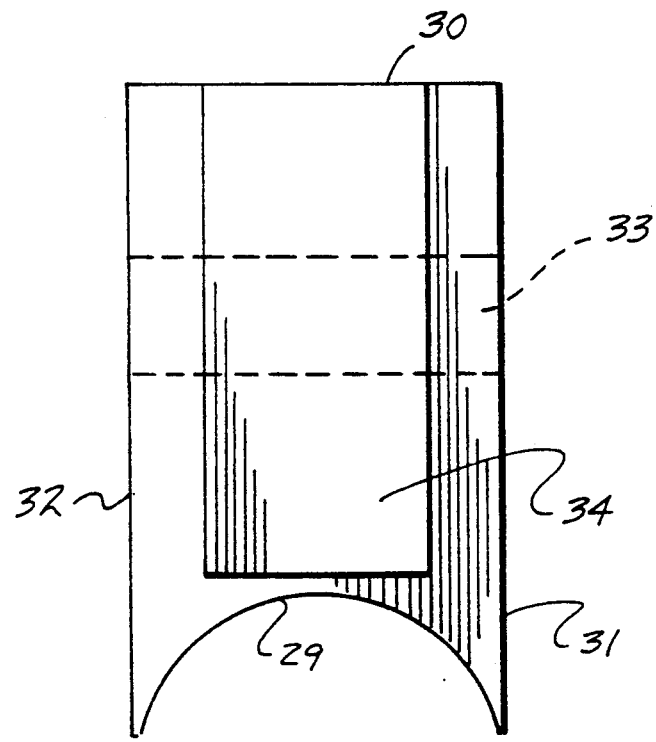
FIG. 8 is an orthographic view, taken along the lines 8—8 of FIG. 2 in the direction indicated by the arrows.

A locking head 28 is provided to effect securing of a trailer pin 36 of an associated trailer 37 (see FIG. 6 for example) within the channel 17 and more specifically, relative to the collar bore 16 receiving the trailer pin 36. The locking head 28 is of a generally T-shaped cross-sectional configuration having an arcuate first end wall 29 arranged to engage the trailer pin 36 in a facing relationship relative to the collar bore 16. A second end wall 30 is spaced from the first end wall, with stepped first and second side walls 31 and 32 arranged coextensive relative to one another, with a side wall bore 33 directed through the first and second stepped side walls 31 and 32, with the side wall bore 33 aligned with the first and second pin bores 21 and 22, with the locking head 28 positioned within the channel 17, in a manner as indicated in FIG. 5 and FIG. 6 for example. The lock pin 23 is in this manner directed through the first and second pin bores 21 and 22, as well as the side wall bore 33. The first and second side walls 31 and 32 are arranged to slidingly engage the U-shaped rib 19 to prevent removal or access to the locking head 28 even upon destruction of the channel floor plate 20 by unauthorized individuals. The locking head top wall 35 is coplanar with the locking collar top wall 12, while the locking head bottom wall 34 is directed to slidingly engage the channel floor plate 20, as illustrated in FIG. 4 for example.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer locking apparatus arranged for securement about a trailer pin, wherein the apparatus comprises, a locking collar, the locking collar having a collar top wall spaced from a collar bottom wall in a spaced parallel relationship, and a discontinuous collar side wall, and a collar axis, with the collar symmetrically oriented about the collar axis, with the collar axis extending through the top wall and bottom wall, and a collar bore directed orthogonally through the top wall and the bottom wall coaxially aligned with the collar axis, and a channel orthogonally oriented relative to the collar axis directed into the collar from the collar side wall, and a locking head arranged for reception within the channel to engage the trailer pin positioned within the collar bore, and lock means directed through the locking collar and the locking head for securement of the trailer pin within the locking collar, and the channel includes a U-shaped channel side wall, the channel side wall having a U-shaped rib coextensive with the side wall intermediate the collar top wall and the collar bottom wall, with the locking head having a T-shaped cross-sectional configuration, and an arcuate first end wall arranged in a facing relationship relative to the collar bore, and a head second end wall spaced from the first end wall, and a stepped first side wall parallel to and coextensive with a stepped second side wall, with the first side wall and the second side wall arranged for sliding arrangement with the U-shaped rib, and the stepped first side wall and the stepped second side wall including a side wall bore orthogonally directed through the stepped first side wall and the stepped second side wall arranged to receive the lock means therethrough,
and the locking head includes a head top wall coplanar with the collar top wall, and the channel having a channel floor plate coplanar with the collar bottom wall, and the locking head having a locking head bottom wall in sliding engagement with the channel floor plate.

2. An apparatus as set forth in claim 1 including a first pin bore and a second pin bore directed through the locking collar, with the first pin bore and the second pin bore coaxially aligned relative to one another, and the first pin bore and the second pin bore intersecting the channel side wall in an orthogonal relationship, and the first pin bore and the second pin bore arranged in a spaced relationship relative to one another on opposed sides of the channel, with the first pin bore, the second pin bore, and the side wall bore coaxially aligned to receive the lock means therethrough, and the lock means includes a lock pin, the lock pin having a lock pin head at a first end of the lock pin, and a lock pin flange at a second end of the lock pin, with the lock pin head having a head diameter and the first pin bore, the second pin bore, and the side wall bore having a second diameter, with the second diameter less than the first diameter, and the lock pin flange projecting beyond the collar side wall when the lock pin is directed through the locking collar and the lock pin flange having a flange bore, and a lock member arranged for projection through the flange bore to secure the locking head within the channel.

* * * * *